US005985078A

United States Patent [19]

Suess et al.

[11] Patent Number: 5,985,078

[45] Date of Patent: Nov. 16, 1999

[54] METHOD OF PRODUCING MARKING ON A SURFACE BY MEANS OF LASER RADIATION AND USE OF AN EMBOSSING FOIL IN SUCH A METHOD

[76] Inventors: Joachim Suess, Emil-Nolde-Strasse 43, Fuerth, Germany, D-8510; Gerhard Zinner, Bluetenstrasse 16, Leinburg, Germany, D-8566

[21] Appl. No.: 07/960,892

[22] Filed: Oct. 14, 1992

[30] Foreign Application Priority Data

Oct. 17, 1991 [DE] Germany ............................ 41 34 271

[51] Int. Cl.$^6$ ...................................................... B32B 31/28

[52] U.S. Cl. ......................... 156/239; 156/235; 156/237; 156/272.8

[58] Field of Search ............................... 156/272.8, 239, 156/235, 240, 268, 277, 230, 237; 219/121.68, 121.77

[56] References Cited

U.S. PATENT DOCUMENTS

| | | | |
|---|---|---|---|
| 3,519,456 | 7/1970 | Reed et al. | 156/240 X |
| 3,650,740 | 3/1972 | Van Paesschen et al. | 156/230 X |
| 3,794,544 | 2/1974 | Magden et al. | 156/239 X |
| 3,926,707 | 12/1975 | Glaser et al. | 156/239 |
| 3,930,924 | 1/1976 | Oka et al. | 156/268 |
| 3,936,570 | 2/1976 | Iwata | 156/240 X |
| 4,027,345 | 6/1977 | Fujisawa et al. | 156/240 X |
| 4,732,410 | 3/1988 | Holbein et al. | 283/67 |
| 4,808,966 | 2/1989 | Ferlier et al. . | |
| 4,968,526 | 11/1990 | Takii et al. | 156/643 X |

FOREIGN PATENT DOCUMENTS

| | | | |
|---|---|---|---|
| 0383956 | 8/1990 | European Pat. Off. . | |
| 0353121 | 1/1990 | France | 156/272.8 |
| 0001787 | 1/1982 | Japan | 156/239 |

OTHER PUBLICATIONS

Article in "Coating"—Nov., 1990, pp. 421 to 426; author—von R. Sussmann

*Primary Examiner*—Curtis Mayes
*Attorney, Agent, or Firm*—Louis E. Marn

[57] ABSTRACT

In a method of producing marking or the like on a surface by means of laser radiation, at least two layers of lacquer of different colors are successively applied to the surface and at least the outer layer which is towards the viewer of the surface is removed by laser radiation in a region-wise manner to expose the second layer therebeneath, thereby producing the marking on the surface. At least the outer layer is applied by a transfer operation from a carrier material, in order thereby to produce a uniform thickness for that layer and thus a highly uniform laser-engraving effect. Also described is the use of embossing foils and more especially hot embossing foils of a particular configuration in such a method.

9 Claims, 1 Drawing Sheet

METHOD OF PRODUCING MARKING ON A SURFACE BY MEANS OF LASER RADIATION AND USE OF AN EMBOSSING FOIL IN SUCH A METHOD

BACKGROUND OF THE INVENTION

The invention concerns a method of producing marking on a surface by means of laser radiation.

In this specification the term marking means any suitable kind of marking such as decoration, labelling, addressing, captioning, inscription and the like.

One form of method of producing marking or the like on a surface by means of laser radiation comprises successively applying to the surface at least two differently colored layers of colored lacquer. The first or outer layer lacquer, which is thus remote from the surface and which faces towards a person viewing the article providing that surface, is removed by means of the laser radiation in a region-wise manner to produce the appropriate marking on the surface, by virtue of the differently colored second layer lacquer therebeneath being exposed.

A method of that nature may be used more especially for example when the situation involves providing precise and accurate markings such as decoration or labelling on articles which are individual parts or which are produced only in small numbers. The laser beam which is used to burn away the first or outer layer of colored lacquer can be easily controlled with a very high degree of accuracy, in respect of its path of movement, for example by means of an electronic computer. In that operation it is also possible to vary the thickness of the line which is produced by the laser beam burning away the material of the outer layer of colored lacquer. Suitable equipment for carrying out that method is available and is offered for example by Baasel Lasertech.

A method of producing safety markings on a surface can also be found in EP 0 383 956 Al, in which a colored layer which is covered by an upper laser radiation-absorbent layer is suitably exposed by removal of the upper layer in a region-wise manner, using a laser beam, but there is no information about the mode of applying the layers to the surface in question.

Hitherto, the operating procedure adopted has been such that the surface on which a marking is to be produced, for example the front plate of a piece of equipment, has been provided with two differently colored layers of lacquer, using conventional application procedures. The upper or outer layer of lacquer is then removed and the underneath layer of lacquer which contrasts in color with the outer layer of lacquer is exposed in a configuration corresponding to the desired marking such as a desired decorative or patterning effect, labelling, caption or the like. In that situation however the problem which arises is that the conventionally applied layers of lacquer suffer from variations in thickness, with the result that, when the outer layer of lacquer is burnt away by means of the laser beam, under some circumstances the outer layer may not be completely removed in the regions in which it is relatively thick. If a higher level of laser power is used, it is then admittedly possible to ensure that the outer layer of lacquer is reliably removed, even where it is of relatively greater thickness. In that case however there is then the risk that the underneath layer of lacquer may also be affected to a considerable degree by the laser beam, in regions in which the outer layer of lacquer is relatively thinner, and the effect on the underneath layer of lacquer may be to such a degree that the underneath layer of lacquer is at least seriously damaged or even completely removed.

A further danger which arises is that, if the layers of lacquer are of different thicknesses, the line produced by means of the laser beam, in spite of the level of laser power remaining at least substantially constant, may be of different widths or strengths, so that, as will be readily appreciated, the appearance of the correspondingly marked surface is also adversely affected in that way. In order to produce acceptable and useful laser marking or decoration or the like, it was therefore necessary hitherto to apply the outer layer of lacquer, namely that which is to be subsequently removed in a region-wise manner by the laser beam, with a thickness which is as uniform as possible. It will be appreciated however that that resulted in a quite inconsiderable increase in the cost of manufacture of articles requiring a marked surface of that kind so that hitherto laser marking was only used for a few areas, more particularly for example in relation to very expensive or high-quality equipment.

SUMMARY OF THE INVENTION

An object of the present invention is to provide a method of producing marking on a surface, which makes it possible to produce satisfactory marking on the surface by means of laser beam engraving, at comparatively low cost.

Another object of the present invention is to provide a method of producing marking or the like on a surface, which permits a considerable increase in the quality of the marking on the surface without requiring excessive structural or apparatus expenditure for that purpose.

Still another object of the present invention is to provide a method of applying marking or the like to a surface by means of laser radiation, which permits close control of the marking procedure.

Yet another object of the present invention is to provide a method of producing marking or the like on a surface which affords a high degree of versatility in terms of the marking effect produced, without involving serious complications in the operating procedure required.

In accordance with the present invention, the foregoing and other objects are achieved by a method of producing marking or the like on a surface by means of laser radiation, wherein at least first and second differently colored layers of colored lacquer are applied one upon the other to the surface. At least the first colored lacquer layer, which is towards a person viewing the surface and which is thus remote from the surface to which the at least first and second layers are applied is transferred from a carrier in a transfer operation. Then at least the first or outer colored lacquer layer is removed by means of the laser radiation in a region-wise manner, thereby to expose the differently colored lacquer layer therebeneath, producing the marking effect.

In this operation, layers of color lacquer can be applied to or produced on a carrier material, for example a plastic foil or a metal strip, in a very uniform thickness, without involving major expenditure to achieve that aim. When then such a layer of colored lacquer is transferred on to a surface to be marked, that ensures that the surface in question also has a layer of colored lacquer of very substantially uniform thickness. The power of the laser which is subsequently used to remove that layer of lacquer can then readily be adjusted to correspond to the thickness of the lacquer. When then the laser beam is moved over the surface to be marked, it is only the upper or outer layer of colored lacquer that is actually removed, and the depth of the laser engraving effect or the thickness of the marking line can be varied by altering the laser power.

It will be seen therefore that, with the method according to the invention, there is at least a substantially reduced risk of any deviations from the desired pattern of marking such as a decoration or labelling, as a result of variations in the thickness of the outer or upper layer of colored lacquer.

The step of transferring the outer colored lacquer layer on to the surface of the article can be carried out by means of a normal transfer operation, without involving an excessive amount of time or trouble. The invention therefore provides a method which makes it possible to improve considerably the quality of markings such as decorations or the like produced on a surface by means of laser beam removal of material, without excessive structural or apparatus expenditure being required for that purpose.

A further advantage of the procedure in accordance with the invention is that it is readily possible to apply layers of lacquer in an only region-wise manner to a flexible carrier such as a plastic foil or a metal strip, for example by means of a printing process. It will be appreciated that in that case it is also possible to apply differently colored lacquers in different regions. If a colored lacquer layer of that kind, which comprises differently colored regions, is used to produce marking on or to decorate the surface of an article, that affords further design options which it was not possible hitherto to achieve at reasonable cost. For example, the surface on which a marking is to be produced can be divided into different colored regions and then a marking can be produced on each thereof by means of a laser beam. In that way it is possible for example to produce given markings on the front plate of an item of equipment in a different color fran the remainder of the marking, in order thereby to emphasise the marking or to associate it with specific operating procedures. If there was a wish to do that previously, then the surface to be marked had to be suitably masked or covered over and then the individual regions had to be sprayed for example with lacquers of the desired colors, in a number of different working operations. It will be clear that it is virtually impossible in such a procedure to achieve even only approximately uniform thicknesses for the differently colored areas or regions of lacquer, as in fact the thickness of the layer of lacquer would depend both on the viscosity of the sprayed lacquer and also the pigmentation and the flow properties thereof.

In a preferred feature of the invention, it is not only the first or outer colored lacquer layer but both the first and second layers which are transferred from a carrier on to the surface to be marked in a transfer operation. In that case it is possible to achieve even greater levels of accuracy in terms of application of the layers of lacquer. That form of the method is desirable in particular also when the second or underneath layer of the colored lacquer comprises differently colored regions, which for example makes it possible to apply differently colored markings such as labels or captions to the front plate of an item of equipment, which can make operation thereof considerably easier under some circumstances.

Preferably, a transparent protective lacquer layer is applied to the first or outer colored lacquer layer, prior to or after the laser treatment, the protective lacquer layer enjoying a suitable level of mechanical strength in order thereby to enhance the mechanical resistance of the marked surface.

In practice, in accordance with a preferred feature, all the lacquer layers are applied by means of transfer foils which comprise a carrier or backing film and the lacquer layers which are releasably disposed thereon.

In a particularly preferred form of that feature, at least the first or outer colored layer lacquer is applied by means of an embossing foil, more preferably a hot embossing foil. Hot embossing foils of that kind can be readily produced using procedures which are known from the production of hot embossing foils generally.

Embossing foils and more especially hot embossing foils for use in the method according to the invention comprise, in superposed relationship, at least a first and a second differently colored lacquer layers, wherein the first colored lacquer layer is arranged closer to the carrier or backing film than the second lacquer layer. The two lacquer layers are colored in accordance with the desired marking or decorative effect; for example the first colored lacquer layer which constitutes the upper or outer layer on the marked surface or article may be black while the other lacquer layer which is exposed by the laser beam, underneath the first-mentioned lacquer layer, may be for example white. The properties of the colored lacquer layers may further be so adjusted that the first or outer lacquer layer can be relatively easily removed by the laser beam but otherwise enjoys comparatively good mechanical strength, while the second or underneath lacquer layer is attacked as little as possible by the laser beam, for example as a result of its coloration or by virtue of the presence of additives.

Desirably, the backing film in such an embossing foil may be a polyester film of a thickness of between 6 and 100 $\mu$m, preferably between 19 and 38 $\mu$m. Such films possess adequate strength but they also have flexibility so that they can be used as a carrier when transferring the decorative layer from the backing or carrier film on to surfaces of different configurations. The operation of transferring the decorative or colored lacquer layers from the carrier on to the article surface to be marked can be carried out using per se known procedures, for example procedures involving a stroke motion, procedures involving a rolling motion, or procedures in which the corresponding foil is introduced into an injection molding mold and then plastic material is injected therebehind to form an article, for example the front plate of an item of equipment. The protective lacquer layer may be a layer of clear lacquer, preferably of a thickness of between 1 and 2 $\mu$m, which, if it is already originally present on the embossing foil, also has to be removed in the laser treatment. It is advantageous if the second colored lacquer layer on the embossing foil is thicker than the first colored lacquer layer, with the thickness of the second layer preferably being between about 2 and 10 $\mu$m while the thickness of the first colored lacquer layer is preferably between about 1 and 5 $\mu$m. The use of a comparatively thin first colored lacquer layer, which thus constitutes the outer layer on the marked surface, and a second colored lacquer layer which is thicker than the first layer, affords the possibility that the power of the laser beam serving to remove the first or outer colored lacquer layer can be set so high that the first colored lacquer layer is reliably entirely removed in the desired region, and possibly even a small part of the second or underneath colored lacquer layer is also removed therewith, while nonetheless guaranteeing that a sufficiently thick part of the second or underneath colored lacquer layer still remains in order on the one hand to provide a satisfactory marking effect such as decorative pattern or the like, while on the other hand still ensuring satisfactory protection for the surface of the article, by virtue of the presence of the second colored lacquer layer.

In a preferred feature of the invention, the method uses an embossing foil such as a hot embossing foil comprising a carrier or backing film which preferably comprises polyester, on which are successively disposed a separation layer, optionally a protective lacquer layer, at least first and second colored lacquer layers of different colors, and an adhesive layer, to produce on a surface the at least first and second differently colored layers of lacquer.

Further objects, features and advantages of the invention will be apparent from the following description of an embodiment of a hot embossing foil for use in the method according to the invention.

DESCRIPTION OF PREFERRED EMBODIMENT

Figure 1:
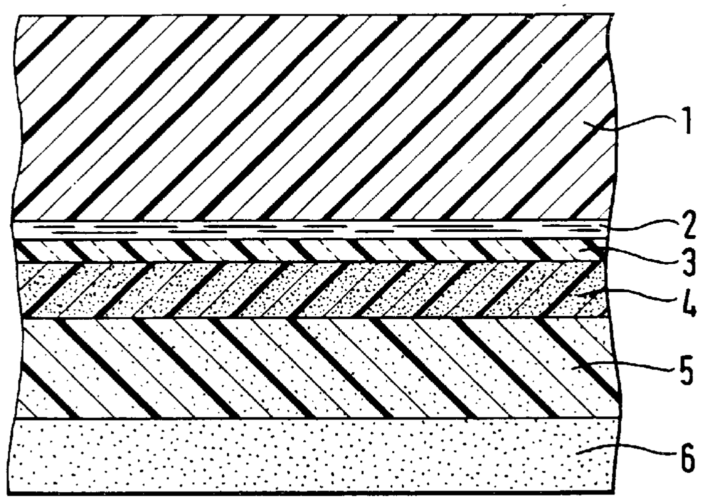
FIG. 1 is a partial view in section through a hot embossing foil for use in a method according to the invention.

Referring firstly to FIG. 1, diagrammatically shown therein is a hot embossing foil comprising a carrier or backing film 1 which here is preferably a polyester film of a thickness of between about 6 and 100 μm, preferably between about 19 and 38 μm.

The film 1 carries successively the following layers which are applied in the usual process which is known per se from the production of hot embossing foils:

Separation layer 2:

This is generally a layer which softens under the effect of heat and which permits the further layers to be detached or released from the carrier film 1. The separation layer 2 is generally of a thickness of at most 1 μm.

Protective lacquer layer 3:

This is a transparent layer of lacquer, the function of which is substantially to protect from mechanical damage the free surface of the article decorated with the hot embossing foil. The protective lacquer layer 3 must therefore be suitably resistant to mechanical effects. In the present case, by way of example, it is between 1 and 2 μm in thickness.

First colored lacquer layer 4:

This for example is a layer of lacquer which is suitably colored by means of carbon black, of a thickness of between about 1 and 5 μm, which can be removed by means of a laser beam.

Second colored lacquer layer 5:

This layer is of a different color from the first colored lacquer layer 4, being for example white or ivory-colored, when the first colored lacquer layer 4 is black.

It is however also possible for the second colored lacquer layer 5, and likewise also the first colored lacquer layer 4, not to be of the same coloration over the entire face of the hot embossing foil and thus over the entire surface to be marked or decorated. On the contrary, the colored lacquer layers 4 and 5 nay be composed individually and thus also differently of regions or areas of different colors.

Adhesive layer 6:

This is an adhesive layer which is known per se in relation to hot embossing foils, being between about 1 and 10 μm in thickness. The adhesive layer for a hot embossing foil is of such a composition that it first becomes adhesive or sticky when subjected to a suitable heating effect. In regard to embossing foils which are to be processed without the application of heat, the adhesive layer may also be for example an adhesive which can be activated by pressure, or a layer of a material which is permanently sticky or adhesive. It will be appreciated that in the latter case the carrier film 1 must be provided on its side remote from the lacquer layers 3, 4 and 5, with a coating, such as silicone, for preventing the adhesive layer 6 from sticking to the carrier film 1, so that the embossing foil can be suitably wound up in a roll.

The separation layer 2, the lacquer layers 3 through 5 and the adhesive layer 6 can be produced in accordance with the following compositions:

| | |
|---|---|
| <u>Separation layer 2:</u> | |
| Toluene | 95 parts |
| Ethanol | 5 parts |
| Ester wax (dropping point 90° C.) | 0.1 part |
| <u>Protective lacquer layer 3</u> | |
| Methylethylketone | 35 parts |
| Ethylacetate | 10 parts |
| Cyclohexanone | 8 parts |
| Methylmethacrylate (softening point 108° C.) | 8 parts |
| Hydroxyfunctional acrylate (60% in EGA/xylene 1:1, OH-content 4.4%) | 4 parts |
| Hydroxyfunctional acrylate (60% in EGA, OH-content 6%) | 4 parts |
| Cellulose nitrate (low viscosity, 35% in alcohol) | 8 parts |
| Polyethylene dispersion (24% in xylene) | 7 parts |
| Aranatic isocyanate (50% in ethylacetate, NCO-content 8%) | 16 parts |
| <u>First colored lacquer layer 4 (black)</u> | |
| Methylethylketone | 30 parts |
| Butylacetate 98/100 | 28 parts |
| Cyclohexanone | 20 parts |
| PVC/PVA-copolymer (85/15) | 11 parts |
| Carbon black | 11 parts |
| <u>Second colored lacquer layer 5 (white)</u> | |
| Methylethylketone | 38 parts |
| Acetone | 11 parts |
| Cyclohexanone | 11 parts |
| Polyvinylbutyral (softening point 125° C.) | 6 parts |
| Straight chain polyurethane (melting 220° C.) | 8 parts |
| $TiO_2$ | 26 parts |
| <u>Adhesive layer 6</u> | |
| Toluene | 15 parts |
| Acetone | 15 parts |
| Ethanol | 38 parts |
| Methyl-/n-butyl-methacrylate copolymer (40% in xylene; tg = 78° C.) | 15 parts |
| Polyethylmethacrylate (tg = 63° C.) | 5 parts |
| Polyvinylacetate (50% in ethanol) | 4 parts |
| $SiO_2$ | 2 parts |
| $TiO_2$ | 6 parts |

Figure 2A:
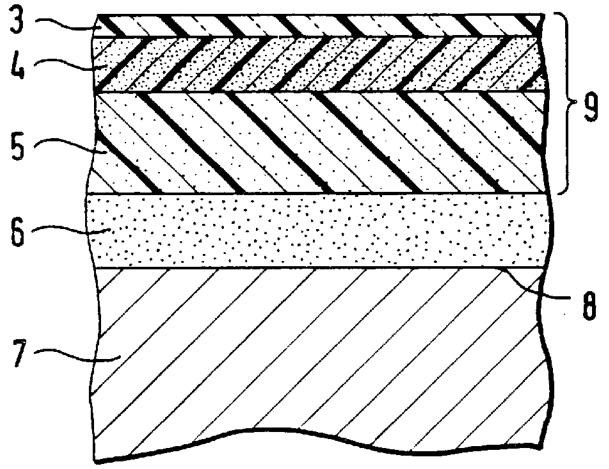
FIG. 2*a* is a partial view in section through a substrate provided on its surface with a corresponding hot embossing foil.

Reference will now be made to FIG. 2*a* showing a view in section of part of a substrate 7, for example a front plate of an item of equipment, to whose surface 8 the lacquer layers 3 through 5 forming a detachment layer 9 and the adhesive layer 6 of the hot embossing foil shown in FIG. 1 are applied in a conventional hot embossing operation.

Figure 2B:
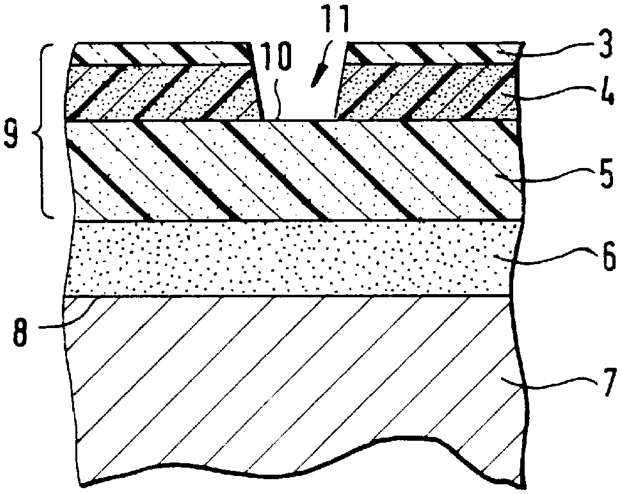
FIG. 2*b* is a view corresponding to that shown in FIG. 2*a*, after a laser treatment has been carried out.

Starting then from the substantially uniformly covered or decorated surface, as shown in FIG. 2*a,* both the protective lacquer layer 3 and also the first or outer colored lacquer layer 4 which in this embodiment is assumed to be black are removed by means of a suitable laser beam treatment to produce the desired marking effect such as decoration, labelling, patterning or the like, more specifically in such a way that the second or underneath colored lacquer layer 5 which is of a different color from the first or outer colored lacquer layer 4 appears at the bottom 10 of the recessed regions 11 which are produced by removal of portions of the layers 3 and 4, for example in the form of lines, letters, areas etc. It will be appreciated that in that respect FIG. 2*b* shows the ideal condition in which removal of the layers of lacquer by means of the laser beam goes precisely as far as the beginning of the second colored lacquer layer 5. In actual fact the procedure will generally be such that a small amount of the underneath colored lacquer layer 5 will also be removed in order to ensure that the exposed regions of that layer are of a unitary and uniform appearance. If the colored lacquer layer 5 over the surface of the article to be marked is composed of areas or regions of different colors, then the exposed parts 10 of the second color lacquer layer 5 will naturally also be of a correspondingly different color.

It has been assumed in relation to the specific embodiment described above that the protective lacquer layer 3 is already present on the hot embossing foil, which means that, when the product or article is in its finished marked or decorated form, the surface 10 of the second colored lacquer layer 5 is exposed as the protective lacquer layer 3 has also been removed by the laser treatment. In certain situations of use it may be desirable for the surface 10 of the second lacquer layer 5 also to be protected. In that case, it is possible to use a hot embossing foil which does not have a protective lacquer layer 3 so that a protective lacquer layer is then applied after the laser treatment over the layers already applied to the surface of the article, so that the applied protective lacquer layer then also fills the recessed regions 11. Another possibility of protecting the surface 10, which gives improved mechanical strength, is to take the condition shown in FIG. 2*b,* that is to say with the protective lacquer layer 3, and then additionally apply a further protective lacquer which then possibly only fills the recessed regions 11.

It will be appreciated that the above-described embodiment and configuration according to the invention have been set forth only by way of example and illustration of the principles of the invention and that various modifications and alterations may be made therein without thereby departing from the spirit and scope of the present invention.

What is claimed is:

1. A method of marking a surface, which comprises:

forming at least two layers of differently-colored lacquer on a carrier;

transferring said layers of differently-colored lacquers to said surface; and exposing region-wise said layer of colored lacquer remote from said surface to laser radiation to thereby expose said layer of colored lacquer proximate said surface thereby producing said marking on said surface.

2. The method as defined in claim 1 and further including the steps of applying a transparent protective lacquer layer over said layers of differently-colored lacquer.

3. The method as defined in claim 2, wherein said transparent protective layer is applied prior to laser radiation.

4. The method as defined in claim 2 wherein said transparent protective layer is applied after laser radiation.

5. The method as defined in claim 1 wherein said at least two layers of differently-colored lacquers are formed on said carrier after forming a release layer on said carrier.

6. The method as defined in claim 1 and further including the step of forming an adhesive layer on a last formed differently-colored lacquer layer.

7. The method as defined in claim 6 wherein said carrier is an embossing foil.

8. The method as defined in claim 7 wherein said embossing foil is a hot embossing foil.

9. The method as defined in claim 1 wherein said carrier is a polyester film.

* * * * *